United States Patent
Bolding et al.

(10) Patent No.: US 6,859,892 B2
(45) Date of Patent: Feb. 22, 2005

(54) SYNCHRONOUS BREAKPOINT SYSTEM AND METHOD

(75) Inventors: Joe Bolding, Allen, TX (US); Dan Tormey, Richardson, TX (US); Gerald Everett, Alta, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 709 days.

(21) Appl. No.: 09/843,265

(22) Filed: Apr. 25, 2001

(65) Prior Publication Data

US 2002/0162051 A1 Oct. 31, 2002

(51) Int. Cl.[7] .............................................. G06F 11/00
(52) U.S. Cl. ...................................... 714/34; 714/11
(58) Field of Search .......................... 714/34, 35, 11, 714/12

(56) References Cited

U.S. PATENT DOCUMENTS

| | | | | |
|---|---|---|---|---|
| 6,263,452 B1 | * | 7/2001 | Jewett et al. | 714/9 |
| 6,279,119 B1 | * | 8/2001 | Bissett et al. | 714/12 |
| 6,598,178 B1 | * | 7/2003 | Yee et al. | 714/34 |
| 6,694,449 B2 | * | 2/2004 | Ghameshlu et al. | 714/11 |
| 6,708,326 B1 | * | 3/2004 | Bhattacarya | 717/124 |

* cited by examiner

Primary Examiner—Nadeem Iqbal
Assistant Examiner—Timothy M. Bonura (57) ABSTRACT

A system and method for synchronizing processors simulated in an architectural simulator for a multiprocessor environment. A synchronous breakpoint is set at a predetermined address location and a code portion targeted for execution on the target multiprocessor environment is launched on the simulator from a fixed location. Upon automatically stepping through a list of processors initialized in the simulator until each of the processors reaches the synchronous breakpoint, run control is returned to the user only after all processors have achieved a synchronous state. Debug operations may ensue thereafter by utilizing a debugger integrated with the architectural simulator.

38 Claims, 5 Drawing Sheets

SYNCHRONOUS BREAKPOINT SYSTEM AND METHOD

BACKGROUND OF THE INVENTION

1. Technical Field of the Invention

The present invention generally relates to software debugging tools. More particularly, and not by way of any limitation, the present invention is directed to a synchronous breakpoint system and method in a high performance multiprocessing environment.

2. Description of Related Art

In spite of the diversity among software program debuggers, they all share a common operational model. In order to fix a bug, the developer executes the program, and then uses a debugger to examine its behavior. Normally, he sets a breakpoint at an address location that is of some significance to the code, the machine on which it is being executed, or both, and the program is launched. When the breakpoint is reached during the runtime, control is returned to the user so that he can single-step forward, trying to delineate what happened in the execution. The user needs to activate the debugger, then run the debugged program and reproduce the problematic behavior.

One of the major problems with this model is that the execution that causes the problem to surface and the execution under the debugger are typically very different. This is analogous to the famous "Uncertainty Principle" in physics as applied to the field of software engineering: the tool that is used to analyze the run actually changes the run characteristics. Unfortunately, this troublesome aspect is particularly vexatious in distributed, client/server, and parallel systems (such as, e.g., multithreaded or multiprocessor systems).

Architecting testable software for high performance computing platforms has accordingly become a daunting task. In today's multiprocessor (MP) systems having a large number of processors in myriad architectural arrangements, the task is even more challenging. Because the teachings of the present invention will be exemplified in particular reference to MP platforms, a brief introduction thereto is immediately set forth below.

In the most general sense, multiprocessing may be defined as the use of multiple processors to perform computing tasks. The term could apply to a set of networked computers in different locations, or to a single system containing several processors. As is well known, however, the term is most often used to describe an architecture where two or more linked processors are contained in a single or partitioned enclosure. Further, multiprocessing does not occur just because multiple processors are present. For example, having a stack of personal computers in a rack is not multiprocessing. Similarly, a server with one or more "standby" processors is not multiprocessing, either. The term "multiprocessing" is typically applied, therefore, only to architectures where two or more processors are designed to work in a cooperative fashion on a task or set of tasks.

There exist numerous variations on the basic theme of multiprocessing. In general, these variations relate to how independently the processors operate and how the workload among these processors is distributed. In loosely-coupled multiprocessing architectures, the processors perform related tasks but they do so as if they were standalone processors. Each processor is typically provided with its own private memory and may have its own mass storage and input/output (I/O). Further, each loosely-coupled processor runs its own copy of an operating system (OS), and communicates with the other processor or processors through a message-passing scheme, much like devices communicating over a local area network. Loosely-coupled multiprocessing has been widely used in mainframes and minicomputers, but the software to do is closely tied to the hardware design. For this reason, among others, it has not gained the support of software vendors and is not widely used in today's high performance server systems.

In tightly-coupled multiprocessing, on the other hand, operation of the processors is more closely integrated. They typically share main memory, and may even have a shared cache. The processors need not be identical to one another, and may or may not perform similar tasks. However, they typically share other system resources such as mass storage and I/O. Additionally, instead of a separate copy of the OS for each processor, they run a single copy, with the OS handling the coordination of tasks between the processors. The sharing of system resources makes tightly-coupled multiprocessing platforms somewhat less expensive, and it is the dominant multiprocessor architecture in the business-class servers currently deployed.

Hardware architectures for tightly-coupled MP platforms can be further divided into two broad categories. In symmetrical MP (SMP) systems, system resources such as memory, disk storage and I/O are shared by all the microprocessors in the system. The workload is distributed evenly to available processors so that one does not sit idle while another is heavily loaded with a specific task. Further, the SMP architecture is highly scalable, i.e., the performance of SMP systems increases, at least theoretically, as more processor units are added.

In asymmetrical MP systems, tasks and resources are managed by different processor units. For example, one processor unit may handle I/O and another may handle network OS (NOS)-related tasks. Thus, it should be apparent that an asymmetrical MP system may not balance the workload and, accordingly, it is possible that a processor unit handling one task can be overworked while another unit sits idle.

SMP systems are further subdivided into two types, depending on the way cache memory is implemented. "Shared-cache" platforms, where off-chip (i.e., Level 2, or L2) cache is shared among the processors, offer lower performance in general. In "dedicated-cache" systems, every processor unit is provided with a dedicated L2 cache, in addition to its on-chip (Level 1, or L1) cache memory. The dedicated L2 cache arrangement accelerates processor-memory interactions in the multiprocessing environment and, moreover, facilitates higher scalability.

As briefly alluded to hereinabove, designing software intended for reliable cross-platform execution on the numerous MP systems available nowadays has become an arduous undertaking. Further, with ever-shrinking design/debug cycle times, software developers are continuously looking for ways to streamline the debug operations necessary to architect well-tested code, be it application software, OS software, or firmware.

In addition, it should be appreciated that oftentimes the hardware development of a particular platform may not have advanced far enough to allow debug testing of the software code targeted for that platform. Typically, an architectural simulator is utilized in such instances. The simulator, which is operable to simulate a target hardware platform, can "execute" a particular piece of software intended for the target hardware as if it were run on the actual machine itself, and is provided with a debugger for debugging the software using the conventional breakpoint methodology as set forth in the foregoing.

Implementing conventional breakpoints for code debugging purposes in multiprocessing environments is beset with several deficiencies, however. In MP systems, the user sometimes desires to set a breakpoint at a particular location but wants control only after all processors have hit that breakpoint. For instance, during the early boot sequence of an MP machine it is useful to have a breakpoint set in the processor synchronization routine, whereby the user regains control only after all the processors have synchronized at the breakpoint. Furthermore, the complex task of debugging in the MP environment is much easier when the processors have attained a known common state.

In the conventional implementation for synchronizing the processors in an MP environment, run control is returned to the user after the first processor hits the breakpoint. As a consequence, the user is required to manually switch to the remaining processors, one by one, and continue with code execution until each of them reaches the same breakpoint. It should be appreciated that such manual switching is highly cumbersome and error-prone, especially where a large number of processors are included in the target hardware platform.

SUMMARY OF THE INVENTION

Accordingly, the present invention advantageously provides a system and method for synchronizing processors simulated in an architectural simulator for a multiprocessor environment, whereby reliable debug operations may be effectuated thereafter by utilizing a debugger integrated with the architectural simulator. A synchronous breakpoint is set at a predetermined address location and a code portion targeted for execution on the target multiprocessor environment is executed on the simulator from a fixed location. When a first processor of the simulated processors encounters the synchronous breakpoint, execution of the code portion is terminated on that processor, while the other processors continue with code execution. When a particular processor of the remaining processors in the simulated multiprocessor environment reaches the synchronous breakpoint, code execution is terminated on that particular processor. This process continues until each of the processors has reached the synchronous breakpoint. Accordingly, by automatically stepping through the list of processors initialized in the simulator, run control is returned to the user only after all of the processors have achieved a synchronous state.

In a further aspect, the present invention is directed to a system and method of debugging a code portion targeted for execution on a target hardware platform. An architectural simulator operable to simulate the target hardware platform is provided for executing the code portion. Preferably, the architectural simulator includes an integrated debugger associated therewith. Also, in a presently preferred exemplary embodiment of the present invention, the target hardware platform comprises a multiprocessor system such as, e.g., a symmetrical multiprocessor system. Upon initializing a list of processors for the target hardware platform in the architectural simulator, a synchronous breakpoint is set at a predetermined address location, preferably by converting a standard breakpoint using a BREAKPOINT SYNC_SET command. Thereafter, the code portion is launched on the architectural simulator from a fixed location. As alluded to hereinabove, the list of processors is stepped through until each of the processors of the architectural simulator reaches the synchronous breakpoint. Only thereafter, program control is returned to the debugger for performing debug operations. After performing appropriate debug operations (e.g., examining the machine state, variable/register lookup, etc.) or other related actions, control can be returned to the code portion execution by releasing the processors from the synchronous breakpoint with issuance of a BREAKPOINT SYNC_RELASE command.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
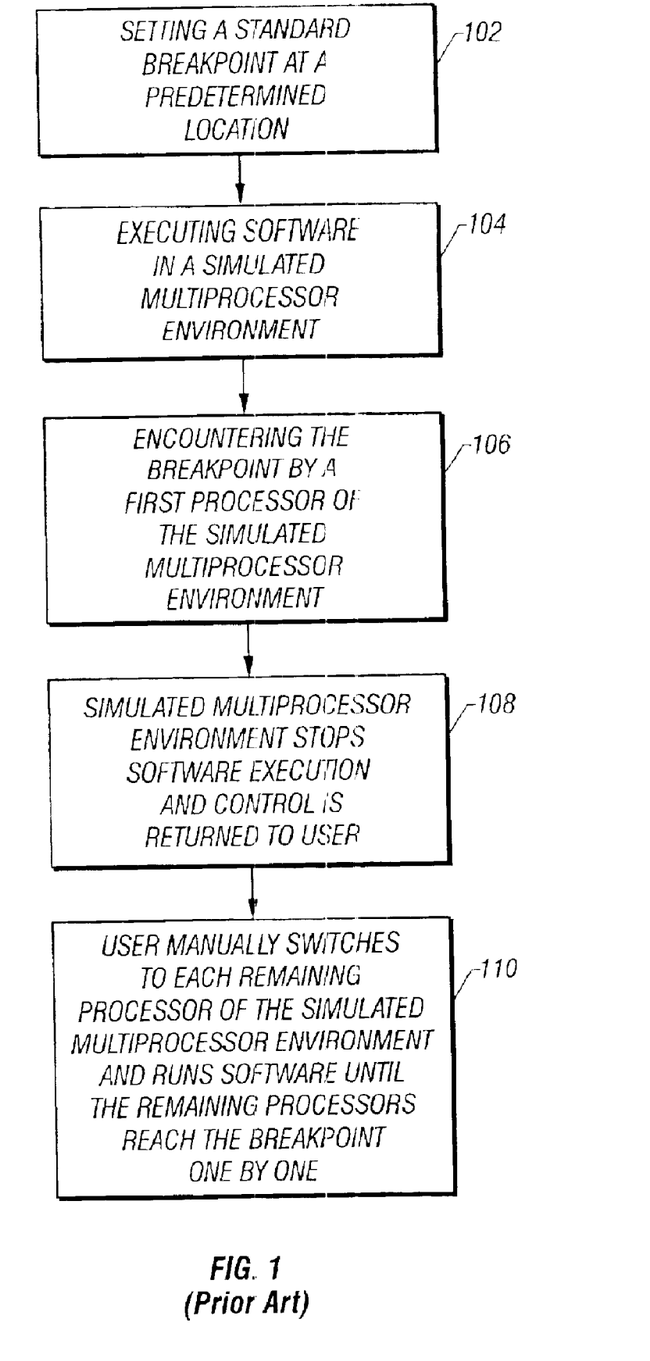
FIG. 1 (Prior Art) is a flow chart of the steps involved in a conventional breakpoint operation.

In the drawings, like or similar elements are designated with identical reference numerals throughout the several views thereof, and the various elements depicted are not necessarily drawn to scale. Referring now to FIG. 1, depicted therein is a flow chart of the steps in a conventional breakpoint operation employed, for example, in debugging a code portion (i.e., software, firmware, or any combination thereof) on a target hardware platform such as a multiprocessor environment using an architectural simulator. Typically, a standard breakpoint is set by a user at a predetermined address location which can be of use or significance for a debugger tool operable with the architectural simulator used for simulating the target multiprocessor system (step 102). Also, a list of processors corresponding to the target multiprocessor system is initialized in the architectural simulator. Upon issuing a suitable command (e.g., a CONTINUE or STEP command), the software code portion is executed or launched in the simulated multiprocessor environment from a fixed location depending on implementation (step 104). When the breakpoint is encountered by a first processor of the simulated processors (step 106), execution of the software code portion is terminated in the simulated multiprocessor system and program control is returned to the user (step 108). Thereafter, the user is required to manually switch to each of the remaining processors and issue another command (e.g., a CONTINUE_ONE command) in order to continue the code execution on the selected processor until it reaches the breakpoint. Accordingly, it should be readily recognized by those skilled in the art that this process of manually switching to a select processor, issuing a CONTINUE_ONE command, and executing the software code portion until the breakpoint is reached, is repeated until all processors in the architectural simulator have reached the breakpoint. These manual loop operations are consolidated as step 110 in the flow chart depicted in FIG. 1. Once the simulator processors are all synchronized at the breakpoint, the user may invoke a user program such as a debugger program for effectuating suitable debugging operations in a conventional manner.

As alluded to in the Background section of the present patent application, it should be appreciated that manually stepping through each processor of the simulated target hardware platform for processor synchronization is highly cumbersome and error-prone, leading to unstable and unreliable debug operations. Moreover, these concerns are exacerbated where high performance computing platforms involving a large number of processors (e.g., 64, 128, and so on) are targeted.

Figure 2A:
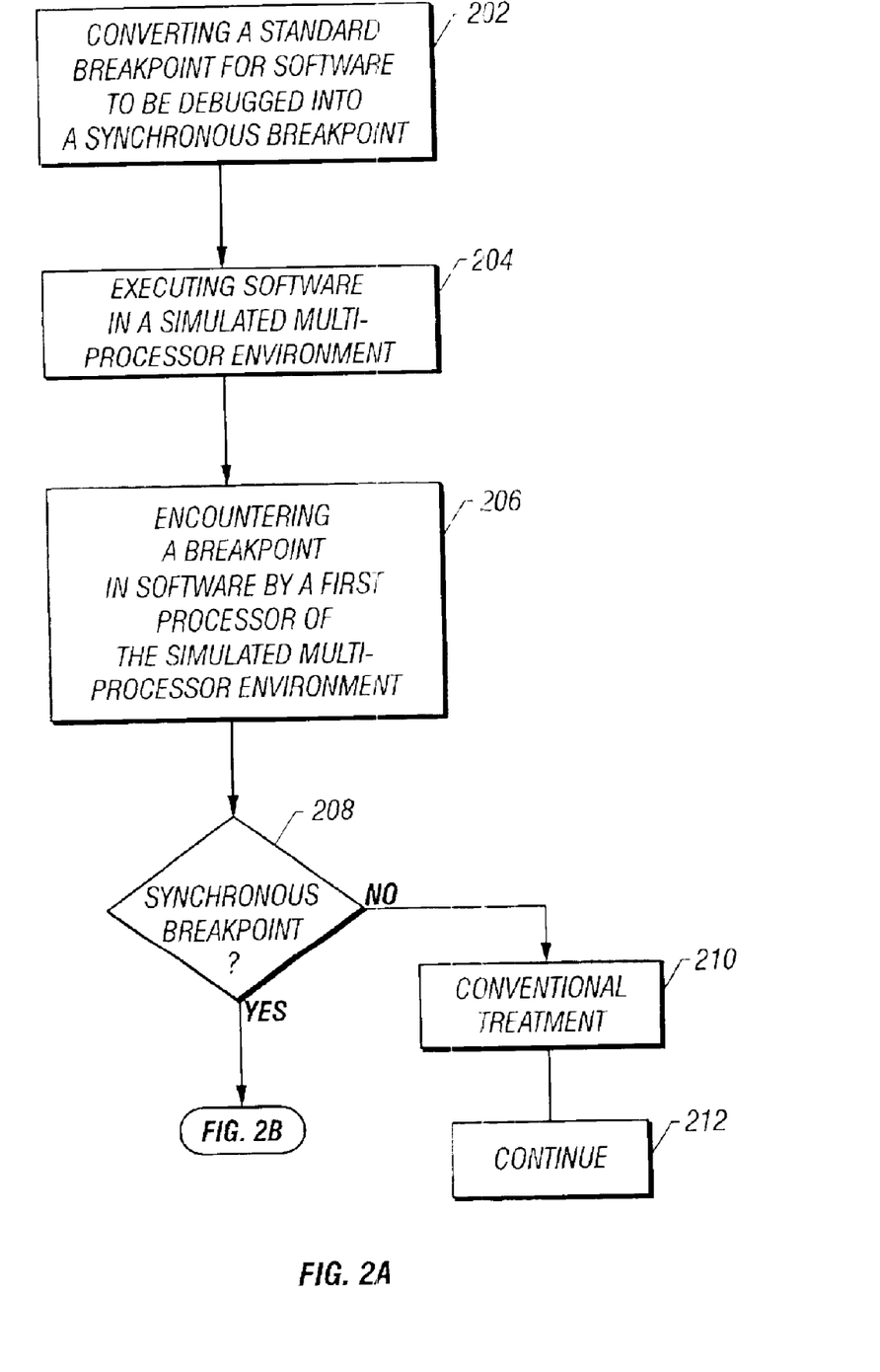
FIGS. 2A and 2B depict a flow chart of the steps involved in an exemplary processor synchronization method provided in accordance with the teachings of the present invention.
Figure 2B:
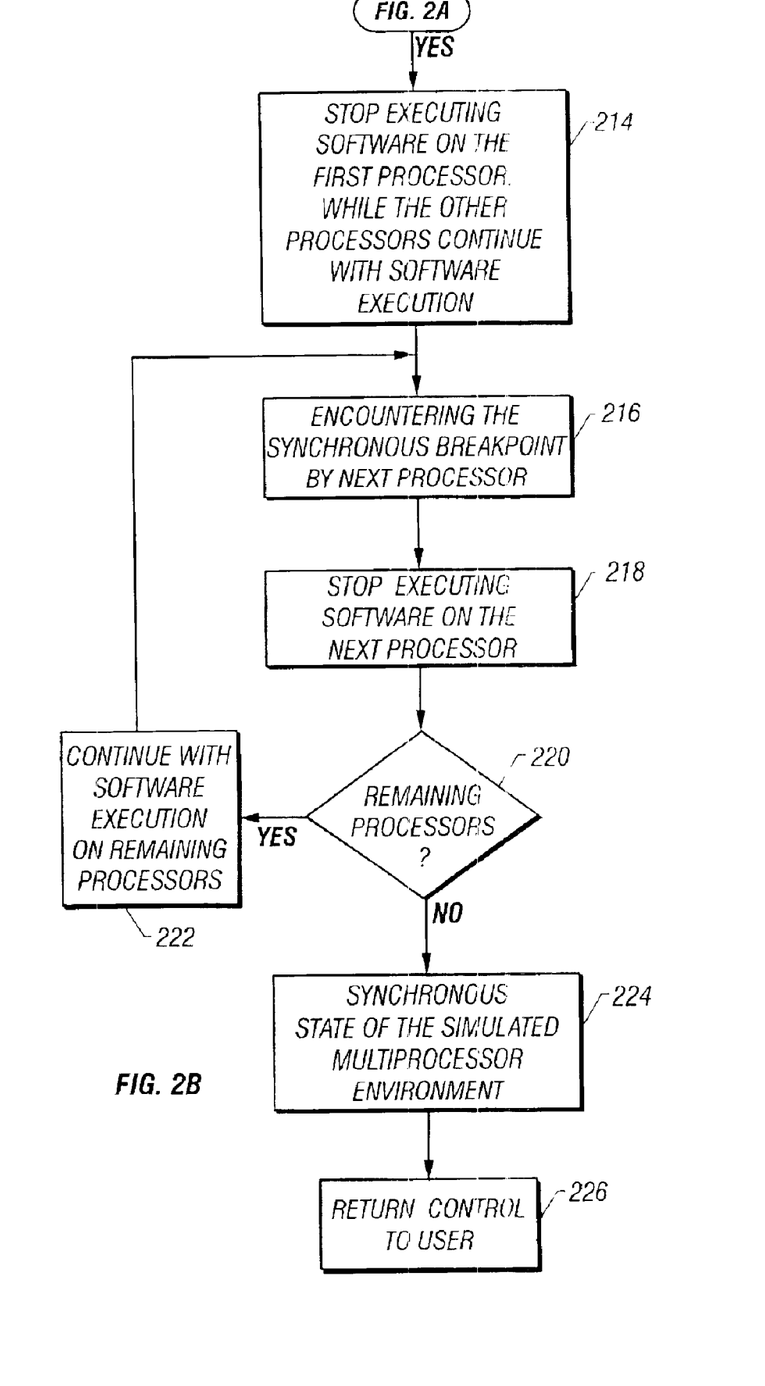

FIGS. 2A and 2B depict a flow chart of the steps involved in an exemplary processor synchronization scheme provided in accordance with the teachings of the present invention. As set forth hereinabove, an architectural simulator is provided for simulating a target multiprocessor system such as, e.g., an SMP system having a select number of processors (for instance, 16, 32, or beyond) in a tightly coupled architecture. It will be understood that the architectural simulator is preferably operable to execute a software code portion targeted for execution on the target hardware platform. Further, a suitable debugger program is preferably integrated within the simulated multiprocessor environment effectuated by the architectural simulator.

A list of processors corresponding to the target hardware platform is initialized in the simulated multiprocessor environment by utilizing appropriate data structures and simulator code set provided with the multiprocessor architectural simulator. A standard breakpoint which can be set at a particular address location with respect to the code portion to be debugged is converted to a synchronous breakpoint (step 202). Preferably, appropriate code means are available in association with the simulated multiprocessor environment for setting a synchronous breakpoint accordingly at a predetermined address that is useful for debugging purposes. In a presently preferred exemplary embodiment of the present invention, a BREAKPOINT SYNC_SET command is issued for converting a standard breakpoint into a synchronous breakpoint, whose general operation is described in greater detail hereinbelow.

Upon processor initialization and arbitration, the code portion is executed on the multiprocessor architectural simulator from a fixed location, preferably using a round robin algorithm for selecting the processors out of the simulated processor list (step 204). Those skilled in the art should appreciate that the code portion intended for the target hardware platform may be comprised of an application program, firmware such as, e.g., a booting sequence, a software tool, an operating system, and the like.

When a breakpoint is encountered by a first processor running the code portion (step 206), a determination is made as to whether the breakpoint is a synchronous breakpoint (decision block 208). If it is determined that the breakpoint is a standard breakpoint, a conventional treatment would follow (step 210), whereupon the code execution in the simulated multiprocessor environment is stopped and run control is returned to the user. As set forth hereinabove, the user has the option of continuing manually in order to step through the remaining processors (step 212).

If the breakpoint encountered in the simulated multiprocessor environment is determined to be a synchronous breakpoint, code execution is stopped on that processor only, while the remaining processors are allowed to continue executing the code portion (step 214). Accordingly, program or run control is not returned to the user at the first encounter of the synchronous breakpoint. As the remaining processors continue executing the instructions of the code portion (preferably in a round robin manner again), the next processor that reaches the synchronous breakpoint (step 216) stops the code execution while the others continue (step 218). Thus, the process of stepping through the processor list of the simulated multiprocessor environment until each processor has reached the synchronous breakpoint is effectuated automatically by implementing an appropriate loop as set forth in decision block 220 and step 222 of the flow chart portion shown in FIG. 2B.

Once the processor list is determined to be empty (decision block 220), a synchronous state is reached by all processors of the simulated environment (step 224). Control may then be returned to the user after such processor synchronization (step 226) for appropriate debug operations, et cetera, as alluded to hereinabove.

Figure 3:
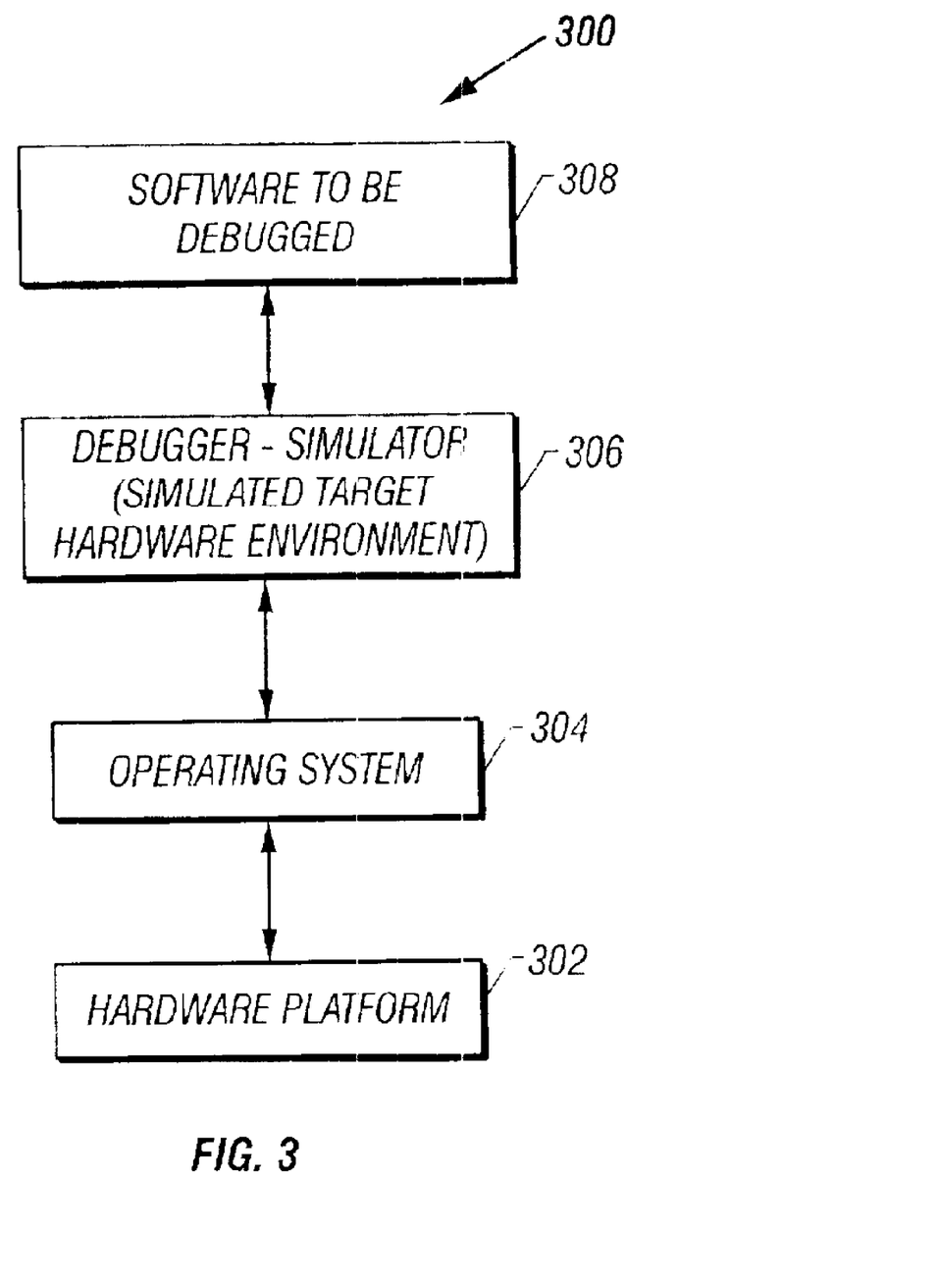
FIG. 3 depicts a high level functional block diagram of a software debugging system provided in accordance with the teachings of the present invention.

Referring now to FIG. 3, depicted therein is a high level functional block diagram of a software debugging system 300 provided in accordance with the teachings of the present invention. A suitable hardware platform 302 (which in itself may be comprised of a high performance computing machine) is provided for hosting an architectural simulator application 306. An operating system 304 provides the software platform on top of which the architectural simulator application 306 is executed. Preferably, a debugger program and other related software/user tools are integrated with the architectural simulator application 306 that is optimized to simulate a target multiprocessor platform such as, e.g., an SMP system. Software code portion 308 intended for execution, optimization, and maintenance on the target SMP system is debugged on the architectural simulator 306, preferably by implementing the synchronous breakpoint operational scheme described hereinabove.

Figure 4:
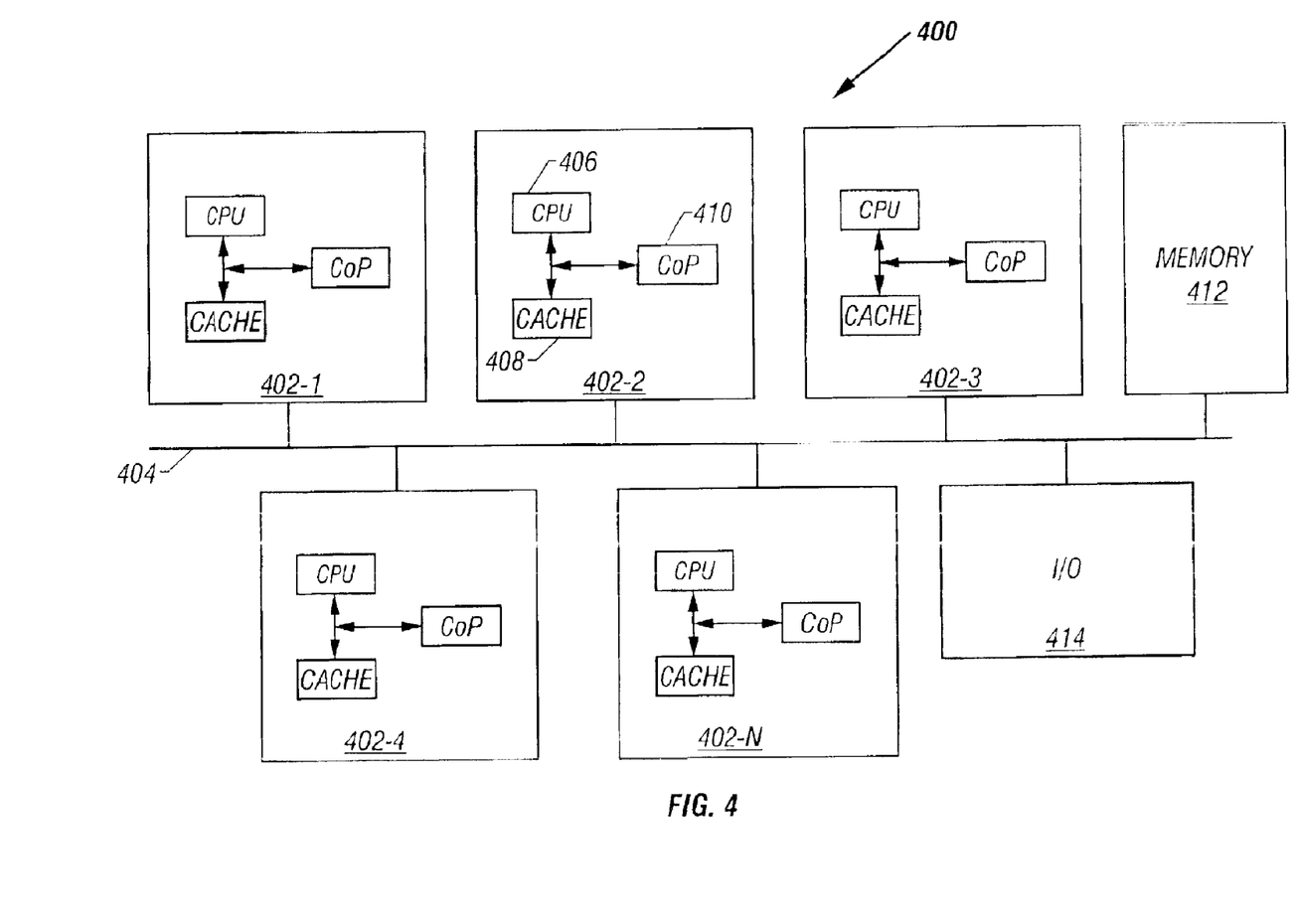
FIG. 4 depicts a block diagram of an exemplary target multiprocessing system simulated in an architectural simulator wherein the teachings of the present invention may be advantageously practiced.

FIG. 4 depicts a block diagram of an exemplary target MP system 400 simulated in an architectural simulator wherein the teachings of the present invention may be advantageously practiced. Reference numerals 402-1 through 402-N refer to a plurality of processor complexes interconnected together via a high performance, MP-capable bus 404. Each processor complex, e.g., processor complex 402-2, is comprised of a central processing unit (CPU) 406, a cache memory 408, and one or more coprocessors 410. Preferably, the MP system is architectured as a tightly coupled SMP system where all processors have uniform access to a main memory 412 and any input/output (I/O) device 414 in a shared fashion. As an SMP platform, each processor has equal capability to enable any kernel task to execute on any processor in the system. Whereas threads may be scheduled in parallel fashion to run on more than one processor complex, a single kernel controls all hardware and software in an exemplary implementation of the MP system 400, wherein locking and synchronization strategies provide the kernel the means of controlling MP events.

Continuing to refer to FIG. 4, each processor complex is preferably provided with its own data structures, including run queues, counters, time-of-day information, notion of current process(es) and priority. Global data structures available for the entire MP system 400 are protected by means such as semaphores and spinlocks. Furthermore, in other implementations of the MP system, the processors may be arranged as "cells" wherein each cell is comprised of a select number of processors (e.g., 4 processors), interrupts, registers and other resources.

The architectural simulator application operable to simulate a hardware platform such as the MP system 400 is preferably provided with the processor synchronization system and method described in greater detail hereinabove. Any software code intended for execution on the MP system may, accordingly, be debugged on the architectural simulator even before the target hardware platform is completely assembled and verified.

Based upon the foregoing Detailed Description, it should be readily apparent that the present invention provides an innovative debugging system and method for software intended for execution on high performance MP systems by utilizing a processor synchronization scheme that successfully overcomes the deficiencies and shortcomings of the state-of-the-art solutions as set forth in the Background section of the present patent application. Because the user is not required to manually step through a large number of processors in the simulated MP environment, the synchronization process is rendered more efficient. Also, because the need for manual intervention is obviated, the task of ensuring that the processors remain at the same breakpoint has become less susceptible to error as the probability that a processor at the breakpoint is accidentally allowed to continue with execution is greatly reduced. Accordingly, the debug operations based on process synchronization can be administered in a highly reliable manner.

Further, it is believed that the operation and construction of the present invention will be apparent from the foregoing Detailed Description. While the system and method shown and described have been characterized as being preferred, it should be readily understood that various changes and modifications could be made therein without departing from the scope of the present invention as set forth in the following claims. For example, while the teachings of the present invention have been particularly exemplified within the context of SMP systems, those skilled in the art should recognize that the present invention can be practiced in conjunction with other hardware platforms including, for example, asymmetrical MP systems, loosely-coupled MP architectures, shared- or dedicated-cache systems, and other high performance computing machines. Also, whereas the use of specific commands has been described in reference to the presently preferred exemplary embodiment of the present invention, such command implementations are merely illustrative. Furthermore, as alluded to in the foregoing Detailed Description, the code portion to be debugged in accordance with the teachings of the present invention may be comprised of any type of software, firmware, or a combination thereof. It should further be apparent that the processor synchronization scheme of the present invention may be advantageously used for purposes other than software debugging. Accordingly, all such modifications, extensions, variations, amendments, additions, deletions, combinations, and the like are deemed to be within the ambit of the present invention whose scope is defined solely by the claims set forth hereinbelow.

What is claimed is:

1. A method of synchronizing processors in a simulated multiprocessor environment operable to execute a code portion to be debugged, comprising:
   providing a synchronous breakpoint at a predetermined address location with respect to said code portion;
   executing said code portion on said processors in said simulated multiprocessor environment from a fixed location; and
   when a first processor of said processors encounters said synchronous breakpoint, terminating execution of said code portion on said first processor while continuing to execute said code portion on remaining processors.

2. The method of synchronizing processors in a simulated multiprocessor environment as set forth in claim 1, further comprising:
   when a particular processor of said remaining processors in said simulated multiprocessor environment reaches said synchronous breakpoint, terminating execution of said code portion on said particular processor while continuing to execute said code portion in said simulated multiprocessor environment until each of said remaining processors has reached said synchronous breakpoint; and
   thereafter, returning run control to a user associated with said simulated multiprocessor environment.

3. The method of synchronizing processors in a simulated multiprocessor environment as set forth in claim 1, wherein said providing a synchronous breakpoint comprises converting a standard breakpoint into said synchronous breakpoint.

4. The method of synchronizing processors in a simulated multiprocessor environment as set forth in claim 3, wherein said standard breakpoint is converted into said synchronous breakpoint by issuing a BREAKPOINT SYNC_SET command.

5. The method of synchronizing processors in a simulated multiprocessor environment as set forth in claim 4, further comprising the step of issuing a BREAKPOINT SYNC_RELEASE command in order to release said processors from said synchronous breakpoint.

6. The method of synchronizing processors in a simulated multiprocessor environment as set forth in claim 4, wherein said step of executing said code portion on said processors is performed in a round robin fashion with respect to said processors.

7. The method of synchronizing processors in a simulated multiprocessor environment as set forth in claim 4, wherein said code portion is selected from the group consisting of an application program, a firmware code portion, a booting sequence, a software tool, and an operating system, and further wherein said synchronous breakpoint comprises a breakpoint converted from a standard breakpoint.

8. The method of synchronizing processors in a simulated multiprocessor environment as set forth in claim 1, wherein a debugger program is operated by said user associated with said simulated multiprocessor environment.

9. The method of synchronizing processors in a simulated multiprocessor environment as set forth in claim 8, wherein said debugger program is integrated with said simulated multiprocessor environment.

10. A method of debugging a code portion targeted for execution on a target hardware platform, comprising:
   providing an architectural simulator operable to simulate said target hardware platform, said architectural simulator having a debugger associated therewith, wherein said target hardware platform comprises a multiprocessor system;
   initializing in said architectural simulator a list of processors included in said target hardware platform;
   setting a synchronous breakpoint at a predetermined address location with respect to said code portion operable to be executed on said architectural simulator;
   launching said code portion on said architectural simulator from a fixed location;
   automatically stepping through said list of processors until each of said processors of said architectural simulator reaches said synchronous breakpoint; and
   thereafter, returning program control to said debugger for performing a debug operation.

11. The method of debugging a code portion targeted for execution on a target hardware platform as set forth in claim 10, wherein said multiprocessor system comprises a symmetrical multiprocessor system.

12. The method of debugging a code portion targeted for execution on a target hardware platform as set forth in claim 10, wherein said multiprocessor system comprises an asymmetrical multiprocessor system.

13. The method of debugging a code portion targeted for execution on a target hardware platform as set forth in claim 10, wherein said multiprocessor system comprises a loosely coupled multiprocessor system.

14. The method of debugging a code portion targeted for execution on a target hardware platform as set forth in claim 10, wherein said multiprocessor system comprises a tightly coupled multiprocessor system.

15. The method of debugging a code portion targeted for execution on a target hardware platform as set forth in claim 10, wherein said step of setting a synchronous breakpoint at a predetermined address location is accomplished by converting a standard breakpoint into said synchronous breakpoint upon issuing a BREAKPOINT SYNC_SET command.

16. A system for debugging a code portion targeted for execution on a target hardware platform, comprising:
    an architectural simulator operable to simulate said target hardware platform, said architectural simulator having a debugger associated therewith, wherein said target hardware platform comprises a multiprocessor system;
    means for initializing in said architectural simulator a list of processors included in said target hardware platform;
    means for setting a synchronous breakpoint at a predetermined address location with respect to said code portion operable to be executed on said architectural simulator;
    means for launching said code portion on said architectural simulator from a fixed location;
    means for automatically stepping through said list of processors until each of said processors of said architectural simulator reaches said synchronous breakpoint; and
    means for returning program control to said debugger for performing a debug operation after said processors have reached said synchronous breakpoint.

17. The system for debugging a code portion targeted for execution on a target hardware platform as set forth in claim 16, wherein said multiprocessor system comprises a symmetrical multiprocessor system.

18. The system for debugging a code portion targeted for execution on a target hardware platform as set forth in claim 16, wherein said multiprocessor system comprises an asymmetrical multiprocessor system.

19. The system for debugging a code portion targeted for execution on a target hardware platform as set forth in claim 16, wherein said multiprocessor system comprises a loosely coupled multiprocessor system.

20. The system for debugging a code portion targeted for execution on a target hardware platform as set forth in claim 16, wherein said multiprocessor system comprises a tightly coupled multiprocessor system.

21. The system for debugging a code portion targeted for execution on a target hardware platform as set forth in claim 16, wherein said means for setting a synchronous breakpoint at a predetermined address location is operable to convert a standard breakpoint into said synchronous breakpoint by issuing a BREAKPOINT SYNC_SET command.

22. A method of synchronizing processors in a simulated multiproceesor environment operable to execute a code portion to be debugged, comprising:
    issuing a BREAKPOINT $SYNC_{13}$ SET command to convert a standard breakpoint into a synchronous breakpoint;
    providing said synchronous breakpoint at a predetermined address location with respect to said code portion;
    executing said code portion on said processors in said simulated multiprocessor environment from a fixed location; and
    when a first processor of said processors encounters said synchronous breakpoint, terminating execution of said code portion on said first processor while continuing to execute said code portion on remaining processors.

23. The method of synchronizing processors in a simulated multiprocessor environment as set forth in claim 22, further comprising:
    when a particular processor of said remaining processors in said simulated multiprocessor environment reaches said synchronous breakpoint, terminating execution of said code portion on said particular processor while continuing to execute said code portion in said simulated multiprocessor environment until each of said remaining processors has reached said synchronous breakpoint; and
    thereafter, returning run control to a user associated with said simulated multiprocessor environment.

24. The method of synchronizing processors in a simulated multiprocessor environment as set forth in claim 22, further comprising issuing a BREAKPOINT $SYNC_{13}$ RELEASE command in order to release said processors from said synchronous breakpoint.

25. The method of synchronizing processors in a simulated multiprocessor environment as set forth in claim 22, wherein said standard breakpoint is converted into said processors is performed in a round robin fashion with respect to said processors.

26. The method of synchronizing processors in a simulated multiprocessor environment as set forth in claim 22, wherein said code portion is selected from the group consisting of an application program, a firmware code portion, a booting sequence, a software tool, and an operating system.

27. The method of synchronizing processors in a simulated multiprocessor environment as set forth in claim 22, wherein a debugger program is operated by said user associated with said simulated multiprocessor environment.

28. The method of synchronizing processors in a simulated multiprocessor environment as set forth in claim 27, wherein said debugger program is integrated with said simulated multiprocessor environment.

29. A method of debugging a code portion targeted for execution on a target hardware platform, comprising:
    providing an architectural simulator operable to simulate said target hardware platform, said architectural simulator having a debugger associated therewith, wherein said target hardware platform comprises a multiprocessor system:
    initializing in said architectural simulator a list of processors included in said target hardware platform;
    converting a standard breakpoint into a synchronous breakpoint upon issuing a BREAKPOINT $SYNC_{13}$ SET command;
    setting a synchronous breakpoint at a predetermined address location with respect to said code portion operable to be executed on said architectural simulator:

launching said code portion on said architectural simulator from a fixed location;

automatically stepping through said list of processors until each of said processors of said architectural simulator reaches said synchronous breakpoint; and thereafter, returning program control to said debugger for performing a debug operation.

30. The method of debugging a code portion targeted for execution on a target hardware platform as set forth in claim 29, wherein said multiprocessor system comprises a symmetrical multiprocessor system.

31. The method of debugging a code portion targeted for execution on a target hardware platform as set forth in claim 29, wherein said multiprocessor system comprises an asymmetrical multiprocessor system.

32. The method of debugging a code portion targeted for execution on a target hardware platform as set forth in claim 29, wherein said multiprocessor system comprises a loosely coupled multiprocessor system.

33. The method of debugging a code portion targeted for execution on a target hardware platform as set forth in claim 29, wherein said multiprocessor system comprises a tightly coupled multiprocessor system.

34. A system for debugging a code portion targeted for execution on a target hardware platform, comprising:

an architectural simulator operable to simulate said target hardware platform, said architectural simulator having a debugger associated therewith, wherein said target hardware platform comprises a multiprocessor system;

means for initializing in said architectural simulator a list of processors included in said target hardware platform;

means for converting a standard breakpoint into a synchronous breakpoint upon issuing a BREAKPOINT SYNC$_{13}$ SET command;

means for setting said synchronous breakpoint at a predetermined address location with respect to said code portion operable to be executed on said architectural simulator;

means for launching said code portion on said architectural simulator from a fixed location;

means for automatically stepping through said list of processors until each of said processors of said architectural simulator reaches said synchronous breakpoint; and means for returning program control to said debugger for performing a debug operation after said processors have reached said synchronous breakpoint.

35. The system for debugging a code portion targeted for execution on a target hardware platform as set forth in claim 34, wherein said multiprocessor system comprises a symmetrical multiprocessor system.

36. The system for debugging a code portion targeted for execution on a target hardware platform as set forth in claim 34, wherein said multiprocessor system comprises an asymmetrical multiprocessor system.

37. The system for debugging a code portion targeted for execution on a target hardware platform as set forth in claim 34, wherein said multiprocessor system comprises a loosely coupled multiprocessor system.

38. The system for debugging a code portion targeted for execution on a target hardware platform as set forth in claim 34, wherein said multiprocessor system comprises a tightly coupled multiprocessor system.

* * * * *

UNITED STATES PATENT AND TRADEMARK OFFICE
CERTIFICATE OF CORRECTION

PATENT NO. : 6,859,892 B2  Page 1 of 1
APPLICATION NO. : 09/843265
DATED : February 22, 2005
INVENTOR(S) : Joe Bolding et al.

It is certified that error appears in the above-identified patent and that said Letters Patent is hereby corrected as shown below:

IN THE CLAIMS

Claim 22, Column 10, line 4, delete "$SYNC_{13}$" and insert therefor --$SYNC\_$--

Claim 24, Column 10, line 30, delete "$SYNC_{13}$" and insert therefor --$SYNC\_$--

Claim 29, Column 10, line 62, delete "$SYNC_{13}$" and insert therefor --$SYNC\_$--

Claim 29, Column 10, line 67, after "simulator" delete ":" and insert therefor --;--

Claim 25, Column 10, line 35, delete "standard breakpoint is converted into" and insert therefor --executing of said code portion on--

Claim 34, Column 11, line 35, delete "$SYNC_{13}$" and insert therefor --$SYNC\_$--

Signed and Sealed this

Fourth Day of March, 2008

JON W. DUDAS
*Director of the United States Patent and Trademark Office*